United States Patent [19]

Lancaster et al.

[11] Patent Number: 4,600,614

[45] Date of Patent: Jul. 15, 1986

[54] HIGH-FREQUENCY HEATABLE PLASTICS

[75] Inventors: Gerald M. Lancaster, Freeport; James A. Allen, Lake Jackson, both of Tex.

[73] Assignee: The Dow Chemical Company, Midland, Mich.

[21] Appl. No.: 531,110

[22] Filed: Sep. 12, 1983

[51] Int. Cl.$^4$ .............................................. B27N 5/02
[52] U.S. Cl. ...................................... 428/35; 428/349; 428/441; 428/461; 428/511; 428/913; 528/392; 383/42
[58] Field of Search ............... 428/441, 511, 461, 349, 428/35; 528/392; 383/42

[56] References Cited

U.S. PATENT DOCUMENTS 3,948,832 4/1976 Hudgin ................................ 528/392
4,157,428 6/1979 Hammer ............................. 528/392

FOREIGN PATENT DOCUMENTS 471169 1/1951 Canada ................................. 528/392

Primary Examiner—Edith Buffalow
Attorney, Agent, or Firm—W. J. Lee

[57] ABSTRACT

Olefin polymers which are unsuited, or ill-suited, for heating, sealing, or bonding by the action of high-frequency electromagnetic radiation, especially microwave radiation, are rendered heatable by such radiation by incorporating carbon monoxide, as a comonomer, into the polymer structure.

20 Claims, No Drawings

HIGH-FREQUENCY HEATABLE PLASTICS

BACKGROUND OF THE INVENTION

The use of high-frequency electromagnetic energy as a means of heating polymers is an advancing art which finds application in many fields, especially in fields in which conventional conductive, convective, or radiant heat energy is either not suitable, not practical, or not possible. For instance, sealing of a polymer to itself or to some other substrate can be (if the composition of the polymer is appropriate) an important commercial technique in producing a desired end-product.

There are some polymers which are not suitable, or at least not well-suited, for high-frequency heating operations. In such ill-suited polymers high-frequency heating either does not occur, or if it occurs it does so only after inefficiently prolonged periods of treatment time. In production assembly lines, e.g., a quick heat-seal operation is generally preferred over a prolonged heat-seal operation.

Among the polymers which are ill-suited for high-frequency heating are olefin polymers, e.g., polymers and copolymers of ethylene, propylene, styrene or other $\alpha$-olefinically unsaturated hydrocarbons having about 2 to about 10 carbon atoms. Some of these olefin polymers may contain polar groups, or polarizable groups, due to the incorporation therein of, e.g., acrylic (or methacrylic) acids or their alkyl esters as comonomers with the olefins, and these groups may, at high levels of incorporation tend to impart a modicum of high-frequency heatability to the polymer, but the efficacy is generally so slight that it is infeasible on a commercial basis. Some polymers having polar groups, e.g. chlorinated P.E., ethylene/vinyl acetate copolymer, PVC, polyvinylidene chloride, and polyamide, are heatable under the influence of certain frequencies of electromagnetic radiation.

Polyethylene is particularly known in the art to be substantially unsuitable for high-frequency heating unless sensitizers are added to the polymer; this is true regardless of whether it is linear or branched, or of whether it is low, medium, or high density (see, e.g., U.S. Pat. Nos. 3,336,173; 3,640,913; and 3,810,799).

It is an object of the present invention to provide ways and means for imparting improved high-frequency heatability to those olefin polymers and copolymers which ordinarily are found to be ill-suited for such heating operations.

SUMMARY OF THE INVENTION

High-frequency heatability (e.g., for sealing, bonding, extrusion, molding, melting, and the like) is imparted to olefin polymers by polymerizing carbon monoxide into the polymer structure, thus providing novel capabilities for high-frequency heating of polymers which, otherwise, are unsuited, or at least ill-suited, for high-frequency heating operations. Novel high-frequency heated articles are prepared and novel high-frequency heating operations are provided as a result of the carbon monoxide inclusion in the polymer.

DETAILED DESCRIPTIONS

The preparation of olefin polymers, copolymers, and terpolymers is well known and the methods and techniques are well known to practitioners of the relevent polymer art. For the most part, the olefin copolymers and terpolymers of interest in this present disclosure are prepared by the well known high pressure, high temperature, free-radical initiated, polymerization method such as the historically-popular ICI process or such as disclosed in U.S. Pat. No. 2,497,323. However, those polymerization processes which employ certain of the coordination catalysts or metal catalysts (e.g., the well-known Ziegler-type, Natta-type, or Phillips-type) may be used by selecting a catalyst (such as in U.S. Pat. No. 3,083,184) which is not easily poisoned or deactivated by carbon monoxide which is generally highly reactive with many metal-carbon bonds.

Olefin polymers within the purview of this invention, and which are rendered heatable (by high-frequency electromagnetic radiation) by incorporating carbon monoxide groups into the polymer chain, are polymers formed by polymerizing monomers having ethylenic (olefinic) unsaturation. A sole olefin or a plurality of olefins may be used along with the carbon monoxide in preparing the polymers. Preferably the olefin monomer is ethylene (sometimes including a small proportion of a $C_3$–$C_8$ aliphatic olefin for property modification). The olefin monomer can also include an unsaturated organic acid having 3 to 8 carbon atoms, such as acrylic acid, methacrylic acid, 1-butenoic acid, and the like; alkyl esters or metal salts of these acids may also be used, such as ethyl acrylate, methyl methacrylate, 2-ethyl hexyl acrylate, sodium acrylate, potassium methacrylate, and the like. Hydrogenated CO containing olefin polymers (which creates C—OH groups along the polymer chain) are included here, such as hydrogenated ethylene/carbon monoxide copolymers. U.S. Pat. No. 2,495,292 discloses methods of hydrogenating such CO groups in a polymer chain.

It has been known for many years that olefins, e.g. ethylene, and carbon monoxide, can be copolymerized or terpolymerized.

The following listed patents are believed to be representative of the art pertaining to interpolymers of carbon monoxide and monoolefins: U.S. Pat. Nos. 2,495,292; 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,522; 4,143,096; and 4,304,887.

It is also known that there are additives (sensitizers) which can be blended into a polymer, e.g. polyethylene, to render it heatable by electromagnetic high-frequency energy, such as talc, $ZnCl_2$, carbon black, nylon, iron oxide, and others. Such additives, however, usually have a pronounced visual, physical, or chemical effect which, in some applications, is desirably avoided. Furthermore, when using additives as sensitizers one is faced with having to obtain a uniform distribution of the sensitizers in order to avoid "hot-spots" which can give irregular results and may even damage the polymer.

It is within the purview of the present inventive concept to create high-frequency sensitizer groups along the polymer chain in polymers which otherwise would be ill-suited for high-frequency heating. In this invention one does not encounter untoward visual effects in the polymer as a result of the sensitizer. Even in the present embodiments wherein a polymer of the present invention is blended with polymer (e.g., as a "master-batch") in order to sensitize the whole, the polymers are generally compatible to an extent at which little or no visual effects are encountered. Thus, clear films of olefin polymes can be prepared, in accordance with the present invention, which are readily heat-sealed using high-frequency energy. It is especially of importance that the present invention provides polymers which are heatable by the action of microwave (MW) energy, a particular portion of the high-frequency energy range, thereby helping to fill a need in the industry where there is a sparsity of polymers which are suitable. The amount of CO groups in the ethylene interpolymers should be in the range of about 0.1 to about 50% by weight, preferably about 1 to about 40% by weight, most preferably about 5 to about 30% by weight.

As used herein "high-frequency sealability" refers to the bonding of the sealable polymer to a portion of itself or to another material using electromagnetic energy frequencies of 0.1–30,000 MHz. This includes radio-frequency (RF) heating and microwave (MW) heating in contradistinction to conventional heat sealing. The high-frequency range is generally taken to include electromagnetic waves over a broad frequency range (0.1 to 30,000 MHz) and covers the ultrasonic frequency range (18 KHz–1000 KHz), the radio frequency (RF) range (1 MHz–300 MHz), and the microwave (MW) frequency range (300 MHz–10,000 MHz). The RF and MW ranges are of particular interest here, with special interest in the MW range due to the increasing use of MW as a processing device.

Uses for this technology (polymer or blends) includes packaging applications where high speed seals are required, e.g., high-frequency activated adhesive films; extrusion coatings; moldings; hot melts in uses such as aseptic packaging, retort pouches, sandwich bags; lamination of foam, fabric, or film layers; powder moldings, and the like. Furthermore, the present invention provides polymers suitable for use in RF extruders, including continuous extruders or batch extruders. Wire and cable coatings can be applied in a continuous RF-extruder by the present invention.

In one aspect, this invention relates to an improved method of rendering a polymer which is not heatable or sealable utilizing high-frequency (0.1–30,000 MHz) electromagnetic radiation (HF) (e.g., polyethylene, polypropylene, polystyrene, etc.) HF-sealable by either incorporation of carbon monoxide by copolymerization or by blending or grafting a carbon monoxide copolymer or terpolymer into the polymer matrix. Hydrogenated forms of the above can also be used. In addition, ethylene/carbon monoxide copolymer (ECO) and interpolymers containing CO can be used for microwave sealing applications (i.e., microwave sealable plastic bags, toothpaste tube sealing, shampoo tube sealing, other microwave sealable containers, valve bag sealing, etc.). We have unexpectedly found that ECO copolymers and interpolymers convert high-frequency electromagnetic radiation into heat for sealing, welding or fusing over a broad frequency range (0.1–30,000 MHz). Typically, ethylene copolymers may be heatable to some extent at low RF frequencies of 1–50 MHz (radio frequency range is typically considered to be from 1–300 MHz; microwave frequency range is 300–30,000 MHz) such as ethylene/vinyl acetate copolymer (EVA), but none have been found which efficiently heat at the higher frequencies. Other examples of polymers heatable at low frequencies, but which do not efficiently heat at the higher frequencies are polyvinyl chloride (PVC), polyvinylidene chloride, chlorinated polyethylene (CPE), and Nylon 6.

The advantages of sealing polymers with high-frequency electromagnetic waves include faster and more efficient sealing, sealing through poor heat-conductors, e.g., paper or cardboard exteriors, stronger seals or bonds, improved economics based on efficient use of energy input, the ability to seal, bond, or laminate larger surface areas, sealing of thicker or more complex film laminates and specific sealing.

Multi-ply articles are obtained which are sealable by the use of high-frequency electromagnetic radiation by employing at least one ply of (a) an olefin/carbon monoxide interpolymer, in which about 0.1% to about 50% of the interpolymer weight is attributable to carbon monoxide, and at least one ply (b) of a material which is unsuited or ill-suited as a high-frequency electromagnetic radiation sealable material, such as paper, cloth, fabric, metal, ceramic, glass, wood, resin, or polymer. There may be, for example, only one (a) and (b) ply; or an (a) ply on each side of a (b) ply; or a (b) ply on each side of an (a) ply; or two (a) plies between (b) plies; or a plurality of alternating (a) and (b) plies. The multi-ply article can also comprise an (a) ply between a first (b) ply and a second (b) ply, wherein the first (b) ply is a lid or a cap of a container and the second (b) ply is a container which is to be closed by the first (b) ply, wherein the (a) ply comprises an olefin/carbon monoxide interpolymer in which about 0.1% to about 50% of the interpolymer is attributable to carbon monoxide, and each (b) ply comprises a material which is unsuited or ill-suited as a high-frequency electromagnetic radiation sealable material.

The general heating rate for the interaction of an electromagnetic wave can be used to determine sealing rates utilizing the following equation:

$$G = 13.3 \times 10^{-14} fF^2(E' \tan \delta) \tag{1}$$

where G is the heating rate in cal/cm$^3$·sec, f is the frequency in Hz of the electromagnetic wave, F$^2$ is the field strength or power in volts/cm, E' is the dielectric constant of the polymer and tan δ is the dielectric loss tangent (measure of the heating property of the material when exposed to HF electromagnetic waves). Thus, in general (since tan δ varies with frequency) the higher the frequency the higher the heating rate or the faster the sealing ability of the material. The carbon monoxide (CO) containing interpolymers can be sealed or heated over a broad frequency range which allows one to have the option of using microwave frequencies for optimum speed in heating or sealing. This feature (heting or sealing over such a broad frequency) appears to be unique to these interpolymers or copolymers containing CO.

There are also advantages of CO copolymers or interpolymers over other polymers (e.g., PVC, PVCl$_2$, CPE, EVA), that are sealable using radio frequency sealing methods which include, for example:

1. ECO is like conventional low density polyethylenes in physical properties and film appearance, i.e., higher melting point, low film blockage, easy processability, can be used for film, extrusion coating and molding resin. Furthermore, the need for plasticizers is obviated.

2. CO can be copolymerized with ethylene and vinyl acetate to produce a CO-modified EVA polymer to render it more sealable and broadens the sealing frequency range. CO can also be copolymerized into an EAA or EMAA polymer allowing an EAA-like or EMAA-like terpolymer to be RF and microwave sealable (EAA and EMAA are not RF or microwave sealable). This includes the metal salts or "ionomer-type" embodiments of these polymers.

3. CO containing copolymers or interpolymers have higher dielectric constants than EVA copolymers, allowing higher field strengths to be used without the fear of arcing.

EXAMPLE 1

The following Table I shows the time required to melt a polymer in a microwave oven (Sears Microclassic microwave oven) at maximum power (brought 275 ml of water to boil in 2.48 minutes).

TABLE I

| Resin* | MI*** | Melt Time (sec)** |
|---|---|---|
| ECO | | |
| 10% CO | 1 | 37 |
| 10% CO | 10 | 35 |
| 5% AA; 10% CO | 10 | 75 |
| 5% AA; 10% CO | 3.5 | 85 |
| 5% AA; 5% CO | 3 | 90 |
| 1% CO | 1 | 90 |
| EVA (14% VA) | wax | >10 min |
| EAA (12% AA) | wax | >10 min |
| Oxidized (PE) | wax | >10 min |
| E/vinyl alcohol | — | 42 |
| EVA/CO (20% CO) | — | 25 |
| EVA | | |
| 28% VA | 3.5 | >10 min |
| 18% VA | 3.0 | >10 min |
| EAA | | |
| 20% AA | 300 | >10 min |
| 30% AA | 1250 | >10 min |
| HDPE (0.965 dens.) | .8 | >10 min |
| LDPE (0.918 dens.) | 6 | >10 min |
| LLDPE (0.918 dens.) | 6 | >10 min |
| Nylon ®-6 resin (dried) | — | >10 min |
| Saran ® B-200 polymer | — | >10 min |
| Chlorinated P.E. | — | >10 min |

*Samples were 2" discs of 60 mil thickness, positioned on a non-RF sensitive polycarbonate sheet.
**If no melting was evident in 10 minutes, the test was stopped and reported as >10 min.
***MI is melt index in accordance with ASTM D-1238.
®Registered tradenames As can be seen from Table I, only ethylene/vinyl alcohol polymer and ethylene interpolymers containing carbon monoxide melted in the microwave oven (2450 MHz).

EXAMPLE 2

In order to determine the RF-sealability of carbon monoxide containing copolymers, a Callanan 1½ KW high-frequency electronic generator equipped with a 3/32"×12" brass sealing electrode and operating over a frequency range of 20–40 MHz (RF) was utilized in the following sealing experiment. Samples of 3 mil blown film of the copolymers shown in Table II were attempted to be sealed using the above RF sealer utilizing various dwell settings (sealing time) and power settings. The seals were examined and a seal was considered to have been made when the two sheets of material could not be separated at the seal point without tearing either piece of film. Table II also shows the improvement in minimum sealing time and resistance to arcing of CO containing copolymers in comparison to EVA copolymers.

TABLE II

RADIO FREQUENCY SEALABILITY

| Resin | Power Setting | Dwell Time sec. | Sealability |
|---|---|---|---|
| EVA | 90 | 3 | No |
| (9.3% VA, 2 MI) | 100 | 3 | No |
| | 100 | 4 | Arc* |
| EVA | 10 | 1 | No |
| (18% VA, 2.5 MI) | 40 | 2 | No |
| | 70 | 2 | Yes |
| | 60 | 2 | Yes |
| | 80 | 1 | Yes |
| | 90 | 2 | Arc |
| EVA | 60 | 2 | No |
| (12.0% VA, 2.5 MI) | 70 | 2 | No |
| | 80 | 2 | No |
| | 90 | 2 | Yes |
| | 100 | 1 | Arc |
| EVA | 30 | 2 | Yes |
| (25% VA, 2 MI) | 20 | 2 | No |
| | 60 | 1 | Yes |
| | 60 | .5 | No |
| | 70 | .5 | No |
| | 80 | .5 | Arc |
| EVA | 40 | 2 | Yes |
| (28% VA, 3.0 MI) | 20 | 1 | Yes |
| | 70 | .5 | Yes |
| | 80 | .25 | Arc |
| | 80 | .5 | Arc |
| ECO | 50 | 2 | No |
| (10% CO, 1 MI) | 60 | 2 | No |
| | 70 | 2 | Yes |
| | 100 | 1 | Yes |
| | 90 | 1 | Yes |
| | 80 | 1 | No |
| | 100 | .5 | Yes |
| | 90 | .5 | No |
| E/AA/CO | 70 | 2 | Yes |
| (5% AA, 10% CO, | 60 | 2 | Yes |
| 3.5 MI) | 50 | 2 | Yes |
| | 70 | 1 | Yes |
| | 60 | 1 | Yes |
| | 70 | .5 | Yes |
| | 60 | .5 | No |
| | 80 | .25 | No |
| | 90 | .25 | Yes |
| E/AA/CO | 70 | .5 | Yes |
| (5% AA, 10% CO, | 80 | .5 | Yes |
| 10 MI) | 80 | .25 | No |
| | 90 | .25 | Yes |

*Arc results in a hole burned through the film.

Within the purview of the present invention, useful articles are prepared which utilize the high-frequency electromagnetic radiation heatability and sealability of the above described CO containing olefin polymers. Layers or plies of these polymers are used as a means for sealing or bonding materials which are not, themselves, efficiently suitable for high-frequency electromagnetic radiation sealing or bonding. Various substrates, including particles, films, sheets, blocks, rods, spheres, and the like can be coated, at least in the area desired to be bonded, with these subject polymers and then sealed or bonded together using high-frequency electromagnetic radiation, especially those frequencies in the microwave range. These polymers, in the form of powders or particles, may be extruded into useful shapes, or as coatings onto other materials (e.g. wire and cable coatings), using high-frequency electromagnetic radiation as the heating means.

We claim:

1. A high-frequency electromagnetic radiation sealable multi-ply article comprising two (a) plies in sealable contact with each other, with their reverse surfaces in sealable contact with (b) plies, wherein each (a) ply comprises an olefin/carbon monoxide interpolymer in which about 0.1% to about 50% of the interpolymer weight is atrributable to carbon monoxide, and each (b) ply comprises a material which is unsuited or ill-suited as a high-frequency electromagnetic radiation sealable material.

2. The multi-ply article of claim 1 wherein the olefin/carbon monoxide interpolymer comprises ethylene polymerized with about 1% to about 40% by weight of carbon monoxide.

3. The multi-ply article of claim 1 wherein the olefin/carbon monoxide interpolymer comprises ethylene polymerized with about 5% to about 30% by weight of carbon monoxide.

4. The multi-ply article of claim 1 wherein the olefin/carbon monoxide interpolymer comprises ethylene polymerized with carbon monoxide and at least one other comonomer selected from the group consisting of olefinically unsaturated organic acids, the alkyl esters of such acids, and the metal salts of such acids.

5. The multi-ply article of claim 1 wherein the olefin/carbon monoxide interpolymer comprises ethylene polymerized with carbon monoxide and acrylic acid.

6. The multi-ply article of claim 1 wherein the olefin/carbon monoxide interpolymer comprises ethylene polymerized with carbon monoxide and methacrylic acid.

7. The multi-ply article of claim 1 wherein the olefin/carbon monoxide interpolymer comprises ethylene polymerized with carbon monoxide and vinyl acetate.

8. The multi-ply article of claim 1 wherein the olefin/carbon monoxide interpolymer comprises ethylene polymerized with carbon monoxide and an alkali metal salt of acrylic acid or methacrylic acid.

9. The multi-ply article of claim 1 wherein the olefin/carbon monoxide interpolymer comprises ethylene polymerized with carbon monoxide and an alkyl ester of an olefinically unsaturated organic acid.

10. The multi-ply article of claim 1 wherein the olefin/carbon monoxide interpolymer comprises an ethylene/carbon monoxide interpolymer wherein the carbon monoxide groups in the polymer chain are hydrogenated.

11. A high-frequency electromagnetic radiation sealable multi-ply article comprising an (a) ply between a first (b) ply and a second (b) ply, wherein the first (b) ply is a lid or cap of a container and the second (b) ply is a container which is to be closed by the first (b) ply,
wherein the (a) ply comprises an olefin/carbon monoxide interpolymer in which about 0.1% to about 50% of the interpolymer weight is attributable to carbon monoxide, and each (b) ply comprises a material which is unsuited or ill-suited as a high-frequency electromagnetic radiation sealable material.

12. The multi-ply article of claim 11 wherein the olefin/carbon monoxide interpolymer comprises ethylene polymerized with about 1% to about 40% by weight of carbon monoxide.

13. The multi-ply article of claim 11 wherein the olefin/carbon monoxide interpolymer comprises ethylene polymerized with about 5% to about 30% by weight of carbon monoxide.

14. The multi-ply article of claim 11 wherein the olefin/carbon monoxide interpolymer comprises ethylene polymerized with carbon monoxide and at least one other comonomer selected from the group consisting of olefinically unsaturated organic acids, the alkyl esters of such acids, and the metal salts of such acids.

15. The multi-ply article of claim 11 wherein the olefin/carbon monoxide interpolymer comprises ethylene polymerized with carbon monoxide and acrylic acid.

16. The multi-ply article of claim 11 wherein the olefin/carbon monoxide interpolymer comprises ethylene polymerized with carbon monoxide and methacrylic acid.

17. The multi-ply article of claim 11 wherein the olefin/carbon monoxide interpolymer comprises ethylene polymerized with carbon monoxide and vinyl acetate.

18. The multi-ply article of claim 11 wherein the olefin/carbon monoxide interpolymer comprises ethylene polymerized with carbon monoxide and an alkali metal salt of acrylic acid or methacrylic acid.

19. The multi-ply article of claim 11 wherein the olefin/carbon monoxide interpolymer comprises ethylene polymerized with carbon monoxide and an alkyl ester of an olefinically unsaturated organic acid.

20. The multi-ply article of claim 11 wherein the olefin/carbon monoxide interpolymer comprises an ethylene/carbon monoxide interpolymer wherein the carbon monoxide groups in the polymer chain are hydrogenated.

* * * * *

UNITED STATES PATENT OFFICE
CERTIFICATE OF CORRECTION

PATENT NO. : 4,600,614

DATED : July 15, 1986

INVENTOR(S) : Gerald M. Lancaster and James A. Allen

It is certified that error appears in the above-identified patent and that said Letters Patent are hereby corrected as shown below:

Col. 6, line 11, Table II; insert this line that was deleted; --70-- under "Power Setting"; --1-- under "Dwell Time"; and --No-- under "Sealability".

Signed and Sealed this

Fourteenth Day of April, 1987

Attest:

DONALD J. QUIGG

*Attesting Officer*    *Commissioner of Patents and Trademarks*